Dec. 13, 1927.

O. T. WALTERS

STALK CUTTER

Filed Feb. 4, 1927

1,652,847

Inventor
O.T.Walters.
By
Attorney

Patented Dec. 13, 1927.

1,652,847

UNITED STATES PATENT OFFICE.

OMER TERAH WALTERS, OF TABLER, OKLAHOMA.

STALK CUTTER.

Application filed February 4, 1927. Serial No. 165,886.

This invention relates to improvements in stalk cutters of that type comprising an elongated body and blades corresponding in length to that of the body and extending beyond the sides of the body.

The invention has for one of its objects to improve stalk cutters of this character to the end that the blades may be firmly secured to the body with the use of but a single bolt or other attaching element.

Figure 1:
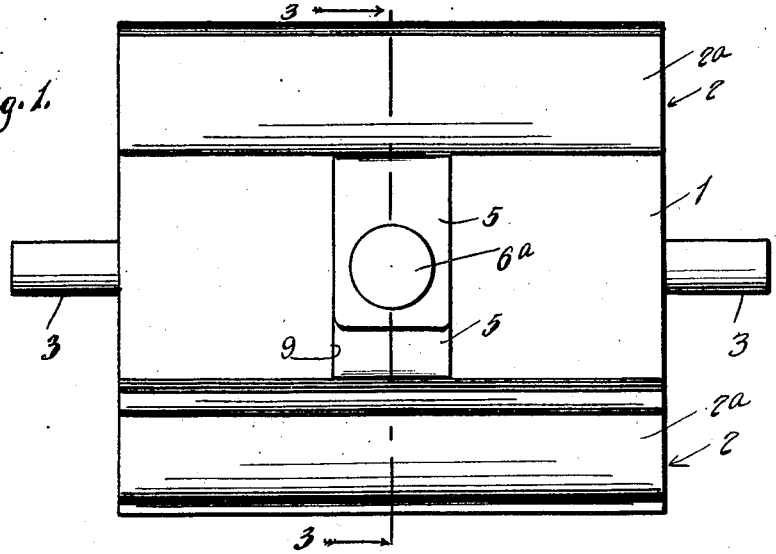
Figure 2:
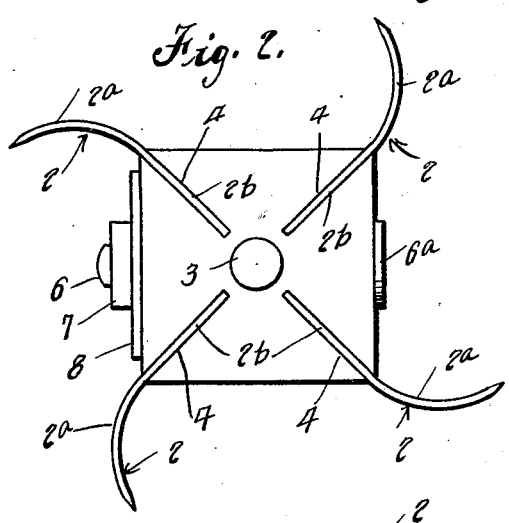
Figure 3:
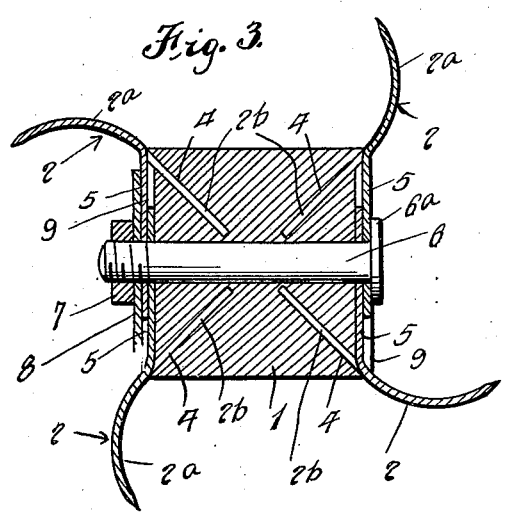
Figure 4:
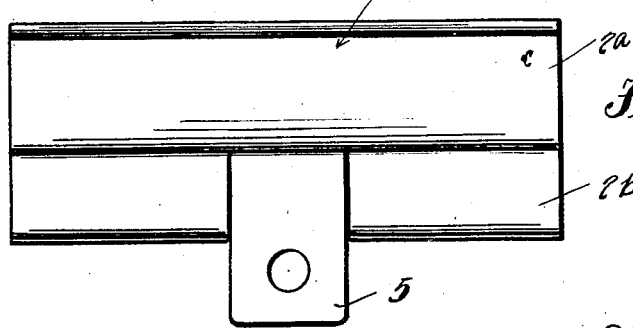

With the foregoing and other objects in view, the invention consists of the construction, combination and arrangement of parts hereinafter fully described and claimed, and illustrated in the accompanying drawing, wherein:

Figure 1 is a view in side elevation of a stalk cutter constructed in accordance with my invention, Figure 2 is a view in end elevation of the stalk cutter, Figure 3 is a transverse sectional view taken on the plane indicated by the line 3—3 of Figure 1, and Figure 4 is an elevational view of one of the blades of the stalk cutter.

Referring to the drawing by reference numerals, 1 designates the body, 2 the blades, and 3 the trunnions of the stalk cutter. In practice the stalk cutter is rotatably mounted on a suitable frame, not shown, through the medium of the trunnions 3 which are secured to the ends of the body 1 in any suitable manner. The body 1 may be of any desired or required length, and is of rectangular formation in cross section. Longitudinally extending grooves 4 are formed in the body 1. The grooves 4 radiate from the axis of rotation of the body 1, and extend through the corners and ends of the body. The blades 2 and body 1 are co-extensive in length, and the former are provided with arcuate outer portions 2ª and inner straight portions 2ᵇ. The blade portions 2ᵇ are positioned in the grooves 4, and are struck up centrally between their ends to provide ears 5 through the medium of which the blades 2 are secured to the body 1. The ears 5 of one pair of the blades 2 are arranged in overlapping relation at one side of the body 1, and the ears of the other pair of the blades are arranged in similar relation at the opposite side of the body. A single bolt 6 passes through the body 1 and ears 5 to secure the blades 2 to the body. The head 6ª of the bolt 6 holds two of the ears 5 against one side of the body 1, and the nut 7 of the bolt and a washer 8 hold the other ears against the opposite side of the body.

From the foregoing description, taken in connection with the accompanying drawing, it will be understood that the blades 2 may be readily applied to the body 1 and secured thereto, and that they are so secured to the body as to render it impossible for them to become casually disengaged therefrom. The body 1 is preferably provided in opposite sides thereof with recesses 9 for the reception of the ears 5, and it may be made of wood or metal.

It should be understood that the drawing is merely illustrative and does not pretend to give exact proportions. Furthermore, the said drawing is illustrative of a preferred construction, it being my expectation that various changes and modifications may be made without departing from the spirit and scope of my invention.

What is claimed is:—

1. A stalk cutter comprising a body provided with grooves extending lengthwise thereof, blades having portions thereof positioned in the grooves and provided with ears arranged at opposite sides of the body, and a retaining element passing through the body and ears.

2. A stalk cutter comprising a body provided with grooves extending lengthwise thereof, blades having arcuate and straight portions of which the latter are positioned in the grooves, ears formed integrally with the blades by striking up parts of their straight portions, said ears being positioned at opposite sides of the body, and a retaining element passing through the body and ears.

3. A stalk cutter comprising an elongated body provided with grooves extending lengthwise thereof and with recesses in opposite sides thereof, blades having portions thereof positioned in the grooves and provided with ears positioned in the recesses, and a bolt passing through the ears and body.

In testimony whereof I affix my signature.

OMER TERAH WALTERS.